3,021,364
PREPARATION OF DRY SODIUM
METHACRYLATE
John A. Cornell, Berwyn, and Daniel J. Gowman, Strafford, Pa., assignors to Sartomer Resins, Inc., Philadelphia, Pa., a corporation of Delaware
No Drawing. Filed Jan. 12, 1960, Ser. No. 1,864
13 Claims. (Cl. 260—526)

The present invention relates to a method of preparing dry alkali metal methacrylate salts by reacting under anhydrous conditions methyl methacrylate with solid alkali metal hydroxide such as LiOH, NaOH or KOH at temperatures of 55–80° C. in the presence of catalytic amounts of alkali metal methacrylate salt, the volatile byproducts of saponification consisting of methanol and unreacted methyl methacrylate being readily removed after the saponification reaction by the heat of reaction and by further evaporative treatment or drying.

The dry alkali metal methacrylate salts produced in accordance with the invention are useful for preparation of other compounds and other compositions. For example, dry alkali metal salts of the invention are useful for preparing crosslinking agents such as glycidyl methacrylate and ethylene glycol monomethacrylate without requiring any separate purification procedure of the alkali metal salt to result in new procedures for manufacturing these products at lower cost. The dry alkali metal salts of the invention are uniquely adapted for conversion to other anhydrous metal salts in the absence of moisture by new methods which are more economical than existing methods and based upon the physical characteristics of the dry alkali metal salt recovered without purification in the present invention. The dry salts of the present invention are useful in the preparation of new polymerizable compositions of matter and are uniquely adapted for use in new sand core molding compositions and in new soil stabilization compositions by procedures adapted to provide a dry polymerizable metal salt of methacrylic acid suitable for wetting vitreous surfaces and adhering thereto; the metal salts specifically useful in this composition include the dry methacrylate salts of zinc, lead, lithium, calcium, magnesium, titanium and zirconium, certain of which are polymerizable per se. The dry alkali metal salts are also useful for the preparation of stabilized methacrylic acid monomer inhibited against polymerization by a new procedure based upon the introduction of inhibitor in the starting methyl methacrylate used for preparing the dry salts of the present invention.

Heretofore, sodium methacrylate has been prepared as shown in United States patent to Coes, No. 2,226,004, by treating methyl methacrylate with dilute sodium hydroxide solution, for example, about 20% of sodium hydroxide in water, and the saponification reaction has been carried out under elevated temperature conditions to distill off volatile methanol and unreacted methyl methacrylate and to thereby produce an aqueous solution of sodium methacrylate in water, the final dry solid sodium methacrylate product being obtained after an added drying operation. The solid product made commercially under the procedure as taught in United States patent to Coes, No.2,226,004, is preferably obtained by spray drying a water solution of the salt and is in the form of a fluffy white powder containing less than 1% of water maximum and having an alkalinity (as NaOH) of 0.2% maximum and assaying 97% minimum of sodium methacrylate.

The procedure of the present invention produces by a single dry saponification step a dry product consisting of dense anhydrous powder formed of spherical aggregates which contain substantially no water (less than 0.05% by weight) and have an alkalinity after completion of saponification of about 0.03–0.09% expressed as NaOH, the product assaying at least 99% as sodium methacrylate monomer.

The present process thus distinguishes over United States patent to Coes, No. 2,226,004, in the discovery that the maintenance of anhydrous conditions throughout saponification and the introduction of sodium methacrylate as seeding catalyst can provide a product of reaction which is of surprisingly high purity based on sodium methacrylate monomer content, made by a single step saponification procedure which eliminates the need for drying in spray drying or drum drying apparatus.

An essential requirement of the present invention is that all of the saponification reactant and saponifiable ester be in a pasty to dry state when mixed and when reacted, this pasty to dry state being maintained throughout the course of the reaction occurring immediately upon mixing at the reacting temperature, there being present seed sodium methacrylate in an amount of at least 3%, preferably about 5 to 25% based on the total weight of the monomer and alkali metal hydroxide charge and that the pasty dry saponification mixture be efficiently agitated with a positive scraping agitator. It is essential that efficient agitation of the medium to heavy dry paste which is immediately formed during the highly exothermic saponification reaction be carried out with a suitable efficient scraper mixing device which prevents the development of excessively high temperatures at local hot spots which are heated above the favorable temperature range due to heat of reaction, the temperature of the mixture rising with explosive violence in the absence of efficient mixing so that even with external cooling, part or all of the reaction mixture is blown out of the reaction vessel.

A suitable positive scraping mixer which can be used is the Day Universal Dough Mixer No. 6½ which is equipped with a "flat agitator," a double-arm agitator of elaborate design, which rotates at the speed of 25 r.p.m. and has a capacity of about 650 pounds of dough.

Other positive scraping kneaders of the bowl type may be used such as kneaders with two agitator arms having a low saddle in the bowl, which forms two half-cylinders in the bottom wherein each agitator works in its trough. The shape of the agitator arm varies; the best known are the S-shaped, Z-shaped, and sigma-shaped. The two agitators overlap and force the dry dough material to travel up at the sides and down in the center of the bowl, while at the same time they give a folding-in action which alters the relative disposition of the dry dough masses, leading to the final homogeneous whole. The agitators sweep the surface of the trough clean, one-half of each half-trough at a time. Replaceable wearing strips may be attached to many of the mixing arms.

By altering the relative angle at which the arms are mounted, the overlap may be made to disappear; by setting the two arms parallel, tangential mixing is secured. Various mixing actions may be secured by changing the relative position of two given agitator arms. As indicated by the manufacturing of the equipment, one position of the agitator arm provides a slight heating of the material and requires little power for long mixing. Another position requires moderate increase in power and produces a greater heating of the material due to mixing, while a third position decreases reaction time considerably and causes a greater increase in heating of the material. With the equipment (J. H. Day Co., Cincinnati, Ohio), good external cooling is needed for the method of the present invention, and is provided.

The kneader is readily adapted for vacuum operation, permitting the removal by evaporation of volatile byproduct at relatively low temperatures (30–60° C.) in reactions where the solid salt product is to be used for further reaction. For temperature regulation, the agitator arms may be cored for circulation of cooling or heating liquid, in addition to placing jackets on the bowl. The vacuum kneader-mixer is used to strip the monomer from the salt and permits operating in an inert gas atmosphere, or under elevated pressure if this is desirable for carrying out further reaction of the salt.

Among the many other apparatus modifications and constructions suitable for the present dry saponification procedure mighe be mentioned a mixer with worm-type agitators which moves the dry mixture of saponification materials along one trough, transfers it to another trough, there moves it in the opposite direction, transferring again, and repeating. The transfer paddles are integral with the worms. This type of mixer with all steel gears and special heavy duty, double-arm agitators has been used for working battery pastes but must be provided with external temperature heating and cooling means for the present procedure.

It may be preferred for extremely heavy mixing as is encountered with large scale batches that a separate agitator drive be provided for both ends of the arms and that a split arm construction be used with a frangible link in the split so that if the load becomes unduly heavy the agitator is not snapped due to torque. It is also useful to provide means for tilting the bowl or to have a bottom discharge. The rotation of the arms may be reversible to assist unloading by gravity through the bottom discharge or by tilting.

For the dry plastic masses in the invention, overlapping action is preferred; the two arms should rotate at the same speed, although the degree of turn of one arm with respect to the other may be selected according to the load which increases after about 70% of the reactants have been charged to the positive scraping agitator bowl.

It is an essential feature of the invention that the solid alkali metal hydroxide such as sodium hydroxide (flake, granular or pellet) or solid potassium hydroxide containing at least 85% KOH in the commercial grade be added to an aliquot portion of methyl methacrylate anhydrous liquid containing seed alkali metal methacrylate salt at a temperature of at least about 55–60° C., preferably 60–650° C., at the start of the reaction to form an initial paste immediately which is quickly mixed for a dry form. The total amount of methyl methacrylate used is at most 1–2% in excess based upon the molecular reacting quantity of the alkali metal hydroxide charged and under no circumstances is the amount of methyl methacrylate less than that required for stoichiometric reaction with all of the solid alkali metal hydroxide.

The purity of the methyl methacrylate and alkali metal hydroxide are each preferably at the highest obtainable level as commercial products. Thus, for example, the alkali metal hydroxide should be substantially free from alkali metal carbonates, chlorides, etc., to comply with the A.C.S. specifications and the methyl methacrylate should be at least 98–99% pure and contain an inhibitor such as hydroquinone in minimum effective amount to prevent thermal polymerization during dry saponification.

One preferred method of preparing anhydrous alkali metal methacrylate salts in accordance with the invention which is especially adapted for the manufacture of small quantities, e.g., from about 10 grams up to 10 kilograms as dense dry finely divided salts, includes the steps of pasting an initial charge of an aliquot portion of about 25% of the total methyl methacrylate used with about 3–20% by weight (based on the total charge) of seed catalyst consisting of anhydrous alkali metal methacrylate and adding to this initial charge in the reaction vessel the remaining methyl methacrylate and the total alkali metal hydroxide charge, each reactant added at a uniform slow rate with efficient positive scraping agitation. The remaining liquid methyl methacrylate and the solid alkali metal hydroxide which are added separately are added at such a uniform rate that a dry paste exists in the mixing bowl at the start and throughout the reaction cycle. A mixture of the seed alkali metal methacrylate may be made with the liquid methyl methacrylate at the expense of part of the seed in the initial charge. As soon as the reacting materials are mixed in the bowl the heat of saponification raises the temperature upwards 5–10° C., e.g., up to 60–65° C. and during the remainder of the reaction external cooling is needed to keep the temperature of the reaction mixture below about 80° C., preferably below about 70° C.

Another method especially suitable for manufacture of larger size batches includes the steps of adding a mixture of alkali metal hydroxide and part of the seeding alkali metal methacrylate to about 25% of the total liquid charge of anhydrous methyl methacrylate in the reaction vessel whereafter the remaining methyl methacrylate seeded with the remaining seed alkali metal methacrylate is added. This procedural manipulation appears to effectively minimize the development of any localized hot spots in large batches of 1,000 pounds and higher.

A third procedure which is less preferred includes the manipulative steps of adding solid alkali metal hydroxide and liquid methyl methacrylate which is seeded with suspended alkali metal methacrylate separately and simultaneously at a slow uniform rate to the reaction vessel. This method develops a heavy load very rapidly and imposes a heavy load on the agitating equipment, particularly when large batches are made.

In each of the foregoing procedures the development of exothermic heat of reaction during seeded saponification takes place under dry pasty conditions and is controlled under efficient mixing solely by the rate of addition of the methyl methacrylate liquid phase and the counter-balancing effect of external cooling water. The rate of addition of the liquid is readily judged by adding an amount of liquid which is less than that which will provide a soft pasty liquefied mixture subsisting for more than 2–3 minutes during mixing, and as will prevent the temperature from rising above 80° C. while using a positive scraping agitator.

This liquid addition must be made at a temperature which will produce substantially immediate saponification of the liquid ester with the dry alkali metal hydroxide to furnish, in the reaction mixture, dry seed salt. This temperature of reaction is at least 55° C. and preferably 60–65° C.

If the efficiency of agitation is poor so that with a long period of uniform incremental addition of methyl methacrylate liquid, there still develop liquid pasty pockets which are not rapidly mulled into dry form, these pockets result in entrapment of volatile impurity and cause "hot" spots which polymerize, discolor and tend to char during the reaction after an appreciable amount of liquid has been added.

Thus, it is an essential feature that the liquid-containing reactant be initially rapidly pasted by the alkali metal hydroxide to be converted into substantially dry seeding salt under effective positive scraping agitation, this seeding salt being effective to overcome the initial induction period preceding the reaction or a delayed explosive heat development. The agitation also prevents the formation of any dry lumps as will escape attrition and break-up.

Due to the highly exothermic nature of the reaction, it is necessary that the liquid-containing reactant be added at a uniform slow rate to permit substantially immediate saponification below 80° C. which converts the liquid reaction mixture quickly to a damp paste and then to a dry paste.

In practice, it has been found that effective temperature control between 55° C. and 80° C. and dry conditions as defined above are achieved during the mixing phase using efficient positive scraping agitation if the total liquid addition is made uniformly over a period of about 40 minutes to about 1½ hours, providing that the initial increments of added liquid are immediately reacted to form the dry product.

In each of the three procedures set out above it is essential that the liquid methyl methacrylate reactant be inhibited against polymerization in order to prevent polymerization. Thus, freshly distilled inhibitor-free monomer should not be used since thermal polymerization may occur during seeded saponification at temperatures of 55–80° C. to cut down on the purity of the anhydrous alkali metal salt of methacrylic acid which results. The inhibitor containing salt is produced in the form of a dense crumbly powder of slightly yellow hue rather than a white hue due to the slightly discolored inhibitor being present. Commercial methyl methacrylate monomer containing very small amounts of phenolic inhibitor, such as hydroquinone, t-butyl catechol, monomethylether of hydroquinone, e.g., about 20 parts of inhibitor per million parts of monomer are preferred over commercial monomer containing a higher level of inhibitor in order to provide a lighter colored product. For producing a very light color, inhibitors showing lesser discoloration under influence of alkali at high temperatures (50–80° C.) such as monomethylether of hydroquinone, are used at a concentration level of about 20–60 parts per million.

The following examples are cited by way of illustration and not by way of limitation.

EXAMPLE 1

One hundred parts of methyl methacrylate and 25 parts of "seeding" sodium methacrylate are added to a reaction bowl fitted with an agitator having two agitator arms, which are Z-shaped. The two agitator arms of the bowl are placed in overlapping relation to force the material in the bowl to travel up at the sides and down in the center of the bowl and to give a folding-in action so as to sweep the material in the bowl free from the bottom surface and the side surface of the bowl.

The seeding sodium methacrylate is an anhydrous dense powder containing less than 0.05% water and having an alkalinity as NaOH of 0.06%.

By use of external heating coils with which the bowl is provided, the temperature of the mixture is brought to about 65–70° C. and 200 parts of flake anhydrous sodium is then added simultaneously with 400 parts of methyl methacrylate, the anhydrous caustic and liquid methyl methylacrylate being added at a uniform rate to the mixing bowl.

The granular sodium hydroxide analyzed as follows:

97.8% NaOH minimum
0.2% $H_2O$ and volatiles
0.60% chlorides as NaCl
1.12% carbonate as $Na_2CO_3$ During the course of the addition of the flake sodium hydroxide and methyl methacrylate, the temperature of the dough-like mixture rose from about 65–70° up to about 75° C. In order to prevent the temperature from increasing above about 80° C., cooling water was applied to the cooling coils surrounding the mixing bowl and the temperature was maintained at a temperature of about 70–75° C. throughout the course of addition which takes about 40–55 minutes. After stirring for an additional 10 minutes, the doughy mixture became less pasty and more crumbly in the dry state, indicating appreciable loss of methanol at the temperature of mixing of about 75° C.

At the end of a reaction period of 75 minutes including liquid addition time of 55 minutes and after mixing of 20 minutes, the alkalinity titrated as NaOH is less than about 4%. An additional quantity of methyl methacrylate liquid is then added in calculated amount to bring the alkalinity as NaOH to less than 0.08%. The reaction mixture is stirred an additional 30 minutes to provide dry dense agglomerated spherical particles in the form of a powder. During the stirring carried out at 70–75° C. methanol vapors are evolved from the reaction mixture. These vapors were recovered in a condenser together with traces of methyl methacrylate. The dense granular product was discharged from the bowl and dried to constant weight at room temperature.

Before drying, the granular product, which is easily broken up in the fingers, had a slightly greasy feeling due to traces of methanol. After drying, the granular product was free from this greasy feeling. The product was assayed and determined to contain 99.5% of sodium methacrylate, less than 0.03% water, and the alkalinity as NaOH is less than 0.05%. Viscosity of a 10% water solution at 25° C. using a #100 Ostwald-Cannon-Fenske viscometer:

Time dist. water=76.7 sec.
Time solution=103.2 sec.

EXAMPLE 2

The proportions and reactants as used in Example 1 are used in this example, except that instead of adding anhydrous sodium hydroxide and methyl methacrylate to a mixture of methyl methacrylate and sodium methacrylate as in Example 1, these reactants are added to a mixture of sodium hydroxide and seed dry sodium methacrylate. Initially, the bowl contains 100 parts of granular sodium hydroxide and 50 parts of sodium methacrylate.

Methyl methachylate in an amount of 500 parts is added simultaneously with 100 parts of anhydrous granular solid sodium hydroxide. In this case, the mixture thickened to a pasty dry dough more quickly than in Example 1. The heat of reaction brought the temperature of the mixture up quickly to a temperature of about 75° C. All of the reactants were added in a period of about 40 minutes. Stirring was continued at 65–75° C. for an additional two hours. An efficient suction fan was fitted to the mixing bowl to draw off vapors of methanol and methyl methacrylate during the additional stirring period and this suction removed traces of methanol. The product contained about 4% NaOH.

Instead of reacting the residual 4% NaOH with methyl methacrylate, this residual NaOH was reacted with methacrylate acid to a point of neutrality using the calculated amount of methacrylic acid based upon the total NaOH present in the mixture.

EXAMPLE 3

*Equipment*

A laboratory three (3) gallon mass and paste mixer having Z blades overlapping, a heating and cooling jacket, a vacuum lid, a dripping funnel for monomer, a central thermometer well for vapor temperature and a thermometer for measuring batch temperature.

*Charge*

| | Lbs. |
|---|---|
| Dry sodium hydroxide (granular) | 6.0 |
| Dry sodium methacrylate (seed) | 0.5 |
| 99.5% methyl methacrylate (inhibited 60 p.p.m. monomethylether of hydroquinone) | [1] 16.0 |

[1] One (1) lb. excess.

*Procedure*

The sodium hydroxide and sodium methacrylate were added to the Z blender. The jacket was heated so that the temperature of the reaction mixture was raised quickly to about 150° F. The methyl methacrylate monomer was dripped in through a funnel having a valve which allowed control of the rate of addition and the temperature of 180–190° F. reaction was controlled by slow addition of methyl methacrylate over a period of 1½ hours. The temperature of the reaction was sufficient to allow the reaction to proceed as the methyl methacrylate was added. The heat of reaction was counterbalanced by the flow of cold water through the jacket of the blender. There was no excess methacrylate monomer until the present reaction was well underway. The time for adding all of the methacrylate liquid was 1 hour and 15 minutes. At the end of reaction, the temperature of the reaction mixture was 190° F. A strong flow of cooling water was kept on the jacket of the blender until the temperature dropped to 185° F. and mixing was continued an additional hour. No attempt was made to recover volatile products. A vacuum was applied through the vacuum lid and it was necessary to heat the mixture during the last 20 minutes of stirring to promote evaporation of volatile material from the mixture.

The product had an NaOH content of 0.04% and assayed at 99.4% sodium methacrylate. Substantially no polymer was present as measured by a viscosity of a 10% water solution of the monomer.

EXAMPLE 4

This example illustrates the preparation of sodium methacrylate without utilizing dry sodium methacrylate addition for seeding, so the procedure as carried out in Example 3 was repeated except that 1 lb. sodium hydroxide was charged and heated to 195° F. and ¼ pound of methyl methacrylate was preheated to 200° F. and then added to the sodium hydroxide charge. Seed particles of dry sodium methacrylate were immediately formed and the temperature rose sharply to 210° F. At this point strong cooling water was applied to bring the temperature back to 180° F. Seed particles of dry sodium methachylate appeared in the pasty reaction mixture and the remainder of the methyl methacrylate was not added until the paste altered its appearance under efficient scraping agitation to the form of a crumbly mass.

The remainder of the methyl methacrylate was added over a period of 35 minutes to maintain the temperature at 185–190° F. A dense dry powder of agglomerated sphere was produced of a slight tan shade having an NaOH content of about 3.9%.

EXAMPLE 5

In this example, the procedure of Example 3 was followed except that the initial charge placed in the blender contained 25% of the total methyl methacrylate containing 10% by weight of dry alkali metal methacrylate as seed, this 10% amount being based upon the total charge of methyl methacrylate and dry sodium hydroxide.

EXAMPLE 6

In this example, powdered commercial KOH was employed and the procedure of Example 3 was carried out, seeding being carried out with dry potassium methacrylate. The temperature of saponification was controlled at 185° F. for a total time mixing and reaction of 2½ hours. The KOH contained 15% of water, but this did not alter the essentially dry characteristics of mixing and reaction throughout the saponification cycle. After 1½ hours of mixing, all of the reactants being added, the temperature was raised to 210° F. and a vacuum of 30 mm. of mercury impressed on the vacuum lid, evaporation was carried out for a period of 1 hour at 210° F., then for 1 hour at 180° F. under a vacuum of 30 mm. of mercury. The amount of KOH impurity in the product was 0.1%. The water content is less than 1%.

EXAMPLE 7

Dry lithium hydroxide containing about 2% water was used as the alkali in this example and molecular reacting proportions for dry saponification were used as in Example 3 using the same proportions of dry lithium methacrylate as the seeding agent. The reaction was carried out at a temperature of 185° F. for a time of 2½ hours. The impurity as LiOH was less than 3.9% in the dry product which was dried to constant weight by vacuum evaporation at 185° F.

EXAMPLE 8

This example illustrates the use of the dry sodium methacrylate product of Example 3 containing about 0.04% NaOH for the preparation of anhydrous methacrylic acid in an inert organic solvent and there is utilized for this conversion of dry alkali metal salt to dry methacrylic acid in solvent solution, a water free mineral acid, preferably dry pure sulfuric acid or anhydrous hydrochloric acid. The inert organic solvent contains the inhibitor originally present in the starting inhibited methyl methacrylate. As illustrated in Example 3, this inhibitor is monomethylether of hydroquinone in an amount of 60 parts per million of methyl methacrylate and a recovery of about 70–90% of this inhibitor in the dry methacrylic acid solution in inert organic solvent is realized in accordance with this example.

Other organic solvent soluble phenolic inhibitors such as tertiary butyl catechol, hydroquinone, catechol, etc. are also suitable for transport from the starting methyl methacrylate to the finished stabilized dry methacrylic acid solution in organic solvent but the recovery of hydroquinone, for example, in the final organic acid solvent solution was about 40–50% as compared with monomethylether of hydroquinone.

The product of Example 3 was suspended in three times the weight of anhydrous benzene and the suspension was treated with the calculated amount of anhydrous HCl based on the sodium content of the salt at a temperature of 50° C. with efficient stirring for 45 minutes. Upon completion of reaction, the precipitated sodium chloride was filtered and the methacrylic acid solution in benzene was analyzed and found to contain an amount of monomethylether of hydroquinone representing a recovery of 80% based on the amount present in the starting methyl methacrylate.

This inhibited solvent solution is suitable for carrying out polymerization reactions and numerous other chemical reactions as are known for methacrylic acid. The solvent solution is particularly suited for preparing such monomers as β-hydroxy propyl methacrylate by the process disclosed in Example III of Caldwell, Patent No. 2,484,487 granted October 11, 1949, monomethylacrylic acid esters of epichlorohydrin by the process of Stein, Patent No. 2,335,813 or alkylene glycol monoethacrylate esters by the process of Woodhouse, Patent No. 2,129,722. Also the inhibited free acid is particularly useful for preparation of Werner complexes coordinating atoms of chromium or zirconium with methacrylate following the general procedure outlined in Goebel and Iler, Patent Numbers 2,544,666 and 2,597,721, and Biefeld and Phelps Industrial and Engineering Chemistry, vol. 45, page 1281 (1953).

The inert organic solvent is a non-polar aromatic or aliphatic solvent such as benzene, toluene, xylene, cumen, petroleum, hydrocarbons, or naphtha products which are prepared for use as special cleaning solvents and may be classed as naphthas.

Having thus defined the invention, what is claimed is as follows:

1. A method of preparing dry alkali metal methacrylate salt comprising saponifying under anhydrous conditions stoichiometric reacting quantities of liquid methyl methacrylate with solid alkali metal hydroxide selected from the group consisting of LiOH, NaOH and KOH at a temperature of 55° C.–80° C. whereby dry alkali metal methacrylate salt is substantially immediately formed to serve as a seeding agent for further saponification and to prevent temperature surge during mixing and reacting, said methyl methacrylate being added at a uniformly slow rate to said alkali metal hydroxide with efficient positive scraping agitation to prevent said temperature from rising above 80° C. and to convert the mixture of said alkali metal hydroxide and said methyl methacrylate liquid into a paste which is formed quickly under agitation into a dry paste whereby there is recovered dense dry alkali metal methacrylate in the form of a dry powder product having an alkalinity of less than about 4% as alkali metal hydroxide.

2. A method as claimed in claim 1 wherein said powder product is additionally treated at 55–80° C. with a further quantity of methyl methacrylate equivalent to the amount of alkali metal hydroxide present as impurity in the powder to reduce the alkali content therein to about 0.03–0.09% expressed as NaOH.

3. A method as claimed in claim 1 wherein said product is subjected to evaporation to reduce the volatile content thereof to less than 0.1% based on the dry weight of said product.

4. A method as claimed in claim 1 wherein an amount of dry solid alkali metal methacrylate salt is added to the charge as seed material, said amount being about 5% to about 25% by weight of said total charge of alkali metal hydroxide and methyl methacrylate.

5. A method as claimed in claim 2 wherein the total of said methyl methacrylate which is added is less than about 2% in excess of the amount required for reaction with said alkali metal hydroxide.

6. A method as claimed in claim 4 wherein an initial mixture containing a portion of the alkali metal hydroxide and a part of the methyl methacrylate liquid are first reacted in the presence of seed alkali metal methacrylate at a temperature of at least about 55° C. whereafter there is added at a uniform rate additional dry alkali metal methacrylate seed catalyst suspended in liquid methyl methylacrylate, the amount of said liquid in said initial mixture being about 10%–25% of the total methyl methacrylate used in the saponification reaction and the amount of said alkali metal hydroxide being present in said initial mixture being sufficient to immediately convert the liquid methyl methacrylate present to a pasty dry condition, the rate of the methyl methacrylate remainder addition and the alkali metal hydroxide remainder addition being both adjusted to maintain the heat of reaction of the dry mixture above a temperature of about 60° C. and below 80° C. whereby temperature surges during dry saponification are prevented.

7. A method as claimed in claim 6 wherein the portion of the remainder of dry alkali metal hydroxide which is added to the initial mixture is mixed with dry alkali metal methacrylate seed.

8. A method as claimed in claim 4 wherein a portion of alkali metal hydroxide and a portion of methyl methacrylate are added to an initial mixture containing an aliquot of about 10–25% of the reacting mixture of alkali metal hydroxide and methyl methacrylate containing from 5–15% of dry seed alkali metal methacrylate based upon the total weight of the reactants said portions being added at a rate to immediately saponify said methacrylate in substantially dry form to alkali metal methacrylate.

9. A method as in claim 4 wherein said methyl methacrylate, said solid alkali metal hydroxide and said dry alkali metal methacrylate are each separately added at uniform rates to the reaction mixture.

10. A method as claimed in claim 4 wherein said alkali metal hydroxide is NaOH.

11. A method as claimed in claim 4 wherein said alkali metal hydroxide is KOH.

12. A method as claimed in claim 4 wherein said alkali metal hydroxide is LiOH.

13. A method as claimed in claim 4 wherein said alkali metal hydroxide is KOH containing up to 15% of water and said reaction mixture is stirred at elevated temperature between 75–80° C. for a period of time sufficient to lower the water content to less than 1%.

References Cited in the file of this patent

UNITED STATES PATENTS

| | | |
|---|---|---|
| 2,026,894 | Hill | Jan. 7, 1936 |
| 2,266,004 | Coes | Dec. 16, 1941 |